United States Patent
Kelley et al.

(10) Patent No.: US 11,365,282 B2
(45) Date of Patent: Jun. 21, 2022

(54) SMA RESIN FORMULATION

(71) Applicant: ISOLA USA CORP., Chandler, AZ (US)

(72) Inventors: Edward Kelley, Singapore (SG); Teck Kai Wong, Singapore (SG); Rebekah F. Theisen, Chandler, AZ (US); Christopher G. Clark, Jr., Singapore (SG)

(73) Assignee: Isola USA Corp., Chandler, AZ (US)

( * ) Notice: Subject to any disclaimer, the term of this patent is extended or adjusted under 35 U.S.C. 154(b) by 93 days.

(21) Appl. No.: 16/320,282

(22) PCT Filed: Jul. 25, 2017

(86) PCT No.: PCT/US2017/043633
§ 371 (c)(1),
(2) Date: Jan. 24, 2019

(87) PCT Pub. No.: WO2018/022563
PCT Pub. Date: Feb. 1, 2018

(65) Prior Publication Data
US 2019/0270873 A1    Sep. 5, 2019

Related U.S. Application Data

(60) Provisional application No. 62/366,115, filed on Jul. 25, 2016.

(51) Int. Cl.
| | | |
|---|---|---|
| *B32B 3/10* | (2006.01) | |
| *C08G 59/42* | (2006.01) | |
| *C08J 5/24* | (2006.01) | |
| *C08L 35/06* | (2006.01) | |
| *C08G 59/62* | (2006.01) | |
| *C08L 63/00* | (2006.01) | |

(52) U.S. Cl.
CPC ....... *C08G 59/4215* (2013.01); *C08G 59/621* (2013.01); *C08J 5/24* (2013.01); *C08L 35/06* (2013.01); *C08L 63/00* (2013.01); *C08J 2325/14* (2013.01); *C08J 2335/06* (2013.01); *C08J 2463/02* (2013.01); *C08L 2203/20* (2013.01); *C08L 2205/025* (2013.01); *C08L 2205/03* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 6,509,414 B2 | 1/2003 | Tikart et al. | |
| 6,645,631 B2 | 11/2003 | Gan et al. | |
| 7,687,556 B2 | 3/2010 | He et al. | |
| 8,129,456 B2 | 3/2012 | Bedner et al. | |
| 2006/0074151 A1 | 4/2006 | He et al. | |
| 2009/0117388 A1* | 5/2009 | Nakanishi | C08J 5/24 428/413 |
| 2011/0132646 A1* | 6/2011 | Levchik | C08G 59/688 174/258 |
| 2011/0278052 A1* | 11/2011 | Hsu | C08L 63/00 174/258 |
| 2012/0238709 A1* | 9/2012 | Metral | C08G 59/4021 525/523 |

FOREIGN PATENT DOCUMENTS

| | | |
|---|---|---|
| CN | 102746616 A | 10/2012 |
| WO | WO 03/048251 | 6/2003 |

OTHER PUBLICATIONS

Tao Wu et al. "Curing of Epoxy Resin with Poly(m-phenylenemethylphosphonate)", Journal of Applied Polymer Science 101(6): 4011-4022 (Sep. 15, 2006).

* cited by examiner

*Primary Examiner* — Christopher M Polley
(74) *Attorney, Agent, or Firm* — McDonnell Boehnen Hulbert & Berghoff LLP

(57) ABSTRACT

Resin compositions including at least two different inert fillers that are useful for preparing prepregs and laminates that are used in manufacturing printed circuit boards.

26 Claims, No Drawings

SMA RESIN FORMULATION

FIELD OF THE INVENTION

This invention relates to resin compositions used to impregnate woven materials that are then partially or fully cured to form prepreg and laminate sheets that are used to manufacture printed circuit boards. The prepregs and laminates that are prepared using the resin compositions of this invention possess excellent electrical performance suitable for high frequency application in electronics, as well as excellent thermal and mechanical performance.

BACKGROUND OF THE INVENTION

Fillers such as talc can be important ingredients in resins used to manufacture prepregs and laminates that are subsequently used in printed circuit board manufacturing. Talc provides thermal stability, fills voids and improves PCB drilling. Styrene maleic anhydride (SMA) is an ingredient of certain resins used to prepare prepregs and laminates. SMA can be included in resins to improve glass transition temperatures (Tg). Talc and SMA, when used together in a resin system for PCB applications can provide prepregs with improved thermal reliability under reflow. However, with ever changing thermal and electrical specifications for laminates and printed circuit boards, there remains a need for prepregs and laminates with improved thermal, electrical and mechanical properties.

SUMMARY OF THE INVENTION

Laminates and prepregs used in printed circuit boards are formed into layups and ultimately into printed circuit boards (PCBs) that include multiple laminate layers that are bonded together. One problem that arises with PCBs is that adjacent laminate layers can delaminate especially when the layups or PCBs are subjected to elevated temperatures. Delamination can cause board failure. Additionally, PCB manufacturers are also starting to demand prepreg materials that can be used to manufacture PCB that exhibit low wicking and white glass characteristics. Therefore, there is a need for prepregs, laminates, resin coated copper and like resin containing materials that are useful in forming PCBs that are less prone to delamination and/or the exhibit improved wicking and/or white glass characteristics.

In one aspect we have discovered that using an unexpected combination of fillers—silica and talc—provides a synergistic combination that improves certain laminate and/or PCB electrical and/or thermal properties more that using either silica or talc alone. This is especially the case with an anhydride curing agent used.

Another aspect is a resin composition comprising styrene maleic anhydride co-polymer; at least one epoxy resin; at least one cross-linking agent; talc; and silica.

Still another aspect is a resin composition comprising: from about 5 to about 40 wt % on a dry solvent free resin basis of a styrene maleic anhydride co-polymer; from about 10 to about 50 wt % on a dry solvent free resin basis of at least one epoxy resin is selected from a brominated bisphenol A, a brominated bisphenol F, a non-brominated bisphenol A, a non-brominated bisphenol F and combinations thereof; from about greater than 0 to about 20 wt % on a dry solvent free resin basis of at least one cross-linking agent is selected from tetrabromobisphenol A, tetra-DOPO-bisphenol A and mixtures thereof; from about 2.5 to about 15 wt % on a dry resin basis of talc; and from about 2.5 to about 15 wt % on a dry resin basis of fumed silica.

Yet another aspect are prepregs and/or laminates including a reinforcing material impregnated with the resins described herein as well as resin coated copper foils comprising a copper foil sheet having a first planar surface and a second planar surface and a layer of B-staged or C-staged resin described herein applied to at least one of the planar surfaces.

DESCRIPTION OF CURRENT EMBODIMENTS

This disclosure is directed generally to resins made from a plurality of ingredients as well as to prepregs and laminates including the partially or fully cured resins.

The resins are made by a "compounding" process where resin ingredients are combined to form a thermosetting resin. The resins are used in one example to manufacture a laminate by "impregnating" a reinforcing material such as a woven glass fabric with the resin. In another example, the resin are used to coat a copper foil sheet to form a resin-coated copper laminate. In another example, the resins are used to form a laminate sheet that does include a reinforcing material. One type of product made using the resins are "prepregs"—i.e., a sheet material that my include resin or a resin impregnated reinforcing material in which the resin in only partially cured or "B-staged". Another type of product that is made from the resins are C-staged laminates in which the resin is fully cured. The ingredients used to formulate the resins are discussed below. Unless stated otherwise, the component weight percent ranges are reported on a "dry" solvent free basis.

The resins of the invention include: (1) at least one SMA co-polymer; (2) at least one epoxy resin; (3) at least one co-crosslinking agent; (4) talc; (5) fused silica; and a catalyst. The resins can include a variety of optional ingredients including a UV blocker, flame retardant and solvents.

Copolymers of SMA

A first component of the resins of this invention is one or more SMA copolymers. Copolymers of styrene and maleic anhydride have been described, inter alia, in Encyclopedia of Polymer Science and Engineering Vol. 9 (1987), page 225. Within the framework of the invention the term "copolymer" likewise refers to SMA or mixtures of SMA.

Useful styrene and maleic anhydrides (SMA) are type 1 SMA copolymers which have a molecular weight in the range of about 1400 to about 50,000 and an anhydride content of more than 15% by weight. Preference is given to SMA copolymers having a molecular weight in the range of 1400 to 10,000. Examples of such copolymers include the commercially available SMA 1000, SMA 2000, SMA 3000, and SMA 4000. These copolymers have a styrene:maleic anhydride ratios of, for example, 1:1, 2:1, 3:1, and 4:1, 5:1, 6:1, 7:1; 8:1 and 9:1 respectively, and a molecular weight ranging from about 1400 to about 4000. Mixtures of these SMAs may also be used.

The amount of SMA copolymer employed in the resins will range from about 5 to about 40 wt % on a dry solids basis and more suitably from about 5 to about 30 wt %.

Epoxy Resin(s)

The term "epoxy resin" in this context refers to a curable composition of oxirane ring-containing compounds as described in C. A. May, *Epoxy Resins,* 2nd Edition, (New York & Basle: Marcel Dekker Inc.), 1988.

Some examples of epoxy resins include: those based on the diglycidyl ether of bisphenol A; on polyglycidyl ethers of phenol-formaldehyde novolac or cresol-formaldehyde novolac; on the triglycidyl ether of tris(p-hydroxyphenyl) methane or on the tetraglycidyl ether of tetraphenylethane; amine types such as those based on tetraglycidyl-methylenedianiline or on the triglycidyl ether of p-aminoglycol; cycloaliphatic types such as those based on 3,4-epoxycyclohexylmethyl-3,4-epoxycyclohexane carboxylate. The term "epoxy resin" also stands for reaction products of compounds containing an excess of epoxy (for instance, of the aforementioned types) and aromatic dihydroxy compounds. These compounds may be halogen substituted.

Preference is given to epoxy resins, which are derivative of bisphenol A, particularly FR4, especially on account of their low price. FR4 is made by an advancing reaction of an excess of bisphenol A diglycidyl ether with tetrabromobisphenol A. Mixtures of epoxy resins with bismaleimide resin, cyanate resin and/or bismaleimide triazine resin can also be applied.

It should be noted that epoxy resins are generally represented by a single, unequivocal structural formula. The skilled person will know that this should be taken to include deviating products resulting from side reactions occurring during epoxy resin preparation. As these side products constitute a normal component of cured epoxy resins, they likewise constitute a normal component of the resins according to the invention.

One or more epoxy resins are included in the resins in a total amount ranging from about 5 wt % to about 50 wt % on a dry basis and more narrowly from about 10 wt % to about 40 wt %. In one aspect of this invention, the resin includes two different epoxy resins.

Cross-Linking Agent(s)

The resins will include one or more cross-linking agents. Useful cross-linking agents include brominated and non-brominated bisphenol A, brominated and non-brominated bisphenol A diglycidyl ether, tetrabromobisphenol A and tetra-DOPO-bisphenol A. As noted above, each cross-linking agent may be optionally be brominated, i.e. substituted with one or more bromine atoms. Brominated co-cross-linking agents are useful because of their flame retarding properties. Preferably, the aromatic moieties of both BPA and BPADGE are substituted with two bromine atoms each, to give tetrabromo-TBBPA and TBBPADGE, respectively. Optionally brominated novolacs can also be used as cross-linking agents.

The amount of cross-linking agent(s) used in the resins will range from about greater that 0 to about 20 wt % on a solvent free or solids basis and more narrowly from about 0.05 to about 10 wt %.

Fillers

The resins of this invention include two or more different fillers. In general the fillers can be selected from one or more of fused silica, amorphous fused silica, crystalline silica, fumed silica, talc, core shell particles, Teflon®, quartz, ceramics, particulate metal oxides in amorphous or crystalline form such as silica, titanium dioxide, alumina, ceria, clay, calcined clay, boron nitride, wollastonite, particulate rubber, polyphenylene oxide and mixtures thereof. Other examples of useful fillers include calcined clay, fused silica and combinations thereof.

Especially useful fillers are talc and silica with fused silica and talc being an especially useful combination. The first filler and second filler are present in the resin in an amount ranging from about 5 wt % to about 50 wt % on a dry resin basis, and more narrowly from about 5 wt % to about 37.5 wt % on a dry resin basis and finally, more narrowly from about 5 wt % to about 25 wt % on a dry resin basis.

When a combination of talc and silica is used in the resin, then the talc should be present in an amount ranging from about 2.5 wt % to about 25 wt % and the silica should be present in an amount ranging from about 2.5 wt % to about 25 wt %. More narrowly, the talc should be present in an amount ranging from about 2.5 wt % to about 15 wt % and the silica should be present in an amount ranging from about 2.5 wt % to about 15 wt % both on a dry resin basis. In an alternative embodiment, the weight ratio of silica or fumed silica to talc in the resin will range from about 1:2.5 to about 5:1 and more narrowly from about 1:1 to about 2.5:1.

One example of useful talc is Microtuff AGD manufactured by Barretts Minerals, Inc. The talc can be silane treated or untreated. In addition, the average talc particle size will be less than about 1.2 microns and preferably less than about 0.9 microns. Smaller talc particles are able to fill resin voids in smaller amounts and as a result the resins are less prone to expansion upon heating.

One example of useful silica filler is an amorphous fused silica and in particular and amorphous fused silica having a $D_{50}$ particle size less than about 6.0 microns and more narrowly less than 4.0. In another example, the silica has percolation threshold of from 2-4 microns. Silica's having a 2-4 micron percolation ration have been found to enhance prepreg or PCB properties such as electrical properties while such properties as well as mechanical properties begin to degrade when using silica having a percolation threshold outside of this range. The silica may be silated (silane treated) or non-silated (not treated with silane). Silane treatment uses silence and silazanes to chemically modify the silica (or talc) surface to render the surface hydrophobic.

Flame Retardants

The compounded resins of this invention may include one or more flame retardants. Any flame retardant that is known to be useful in resin compositions used to manufacture composites and laminates use to manufacture printed circuit boards may be used. The flame retardants may contain halogens or they may be halogen free. Examples of useful flame retardants include, but are not limited to, halides of glycidyl etherified bifunctional alcohols, halides of novolac resins such as bisphenol A, bisphenol F, polyvinylphenol or phenol, creosol, alkylphenol, catechol, and novolac resins, inorganic flame retardants such as antimony trioxide, red phosphorus, zirconium hydroxide, barium metaborate, aluminum hydroxide, and magnesium hydroxide, and phosphorous-based flame retardants such as tetraphenyl phosphine, tricresyl-diphenyl phosphate, triethyiphosphate, cresyldiphenylphosphate, xylenyl-diphenyl phosphate, acid phosphate esters, ammonia phosphate, ammonia polyphosphate, ammonia cyanurate, phosphate compounds containing nitrogen, and phosphate esters containing halides.

Phosphorous-based flame retardants may include, for example those disclosed in U.S. Pat. Nos. 6,645,631, 7,687, 556 and 8,129,456 the specifications of each of which is incorporated herein by reference.

Flame retardants will be present in the resin compositions of this invention in an amount sufficient to allow laminates made from the resin compositions to pass the UL-94 flammability test. More narrowly, the flame retardant or combinations thereof may be present in the resin in an amount ranging from about 5 wt % to about 50 wt %, or from about 10 wt % to about 30 wt % on a dry weight basis.

In one preferred embodiment, the flame retardant is the solid flame retardant decabromodiphenylethane, which has the following structure:

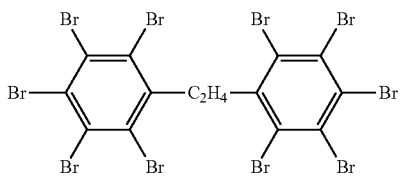

Decabromodiphenylethane is commercially available, for example, from Albemarle Corporation (451 Florida St., Baton Rouge, La. 70801). The Albemarle product is sold as Saytex™ 8010. Decabromodiphenylethane also unexpectedly improves the dielectric properties of the cured resin composition. As a result, decabromodiphenylethane can be included in the resin compositions in amounts far greater than is necessary for a flame retardant in order to also enhance the dielectric properties of the cured resin. Another useful high bromine content insoluble flame retardant is ethylenebistetrabromophthalimide which is sold as Saytex BT93 W by Albemarle Corporation. Other similar useful flame retardants include decabromodiphenyl oxide and brominated polystyrene.

Initiators/Catalysts

The resins will further include an initiator/catalyst the promotes the cross-linking of resin ingredients by, for example, performing a variety of functions such as encouraging homopolymerization and/or crosslinking resin ingredients and to be available during resin thermosetting to enhance the rate of resin cure. The initiators/catalysts chosen may be any compound that is known to be useful in resin synthesis or curing whether or not it performs one of these functions.

On example of useful initiators are azo-type initiator/catalyst such as azobisisobutyronitrile (AIBN), 2-propyl imidiazole (2-PI), tetrabutylphophonium acid acetate (TBPAAc) and 2-methylimidazole (2-MI).

The amount of initiator used depends upon its application. When used in a resin, the initiator will be present in an amount ranging from about 0.01 to about 3.0 wt % and more narrowly from about 0.05 to about 1 wt %.

In certain aspects, the resins will generally include the ingredients in amounts reported in Table 1 below where the amounts are reported in parts by weight on a solvent-free or solids only basis.

TABLE 1

| Ingredient | Resin Formula Wt % |
| --- | --- |
| SMA | 10-40 |
| Epoxy resin such as brominated or non-brominated bisphenol A or Bisphenol F | 5-40% |
| tetrabromobisphenol A or tetra-DOPO-bisphenol A | 0-20 |
| Flame retardant | 0-20 |
| At least two fillers | 5-40 |

An alternative resin composition is summarized in Table 2 below where ingredient amounts are reported in parts by weight including solvent(s).

TABLE 2

| Component Name | Chemical Name | Resin Formula Wt % |
| --- | --- | --- |
| Solvent | Acetone, methyl ethyl ketone, propyl acetate, toluene, cyclohexanone | 30-40 |
| SMA | Styrene maleic anhydride copolymer | 15-30 |
| Epoxy Resin | Epoxy resin - brominated or non-brominated bisphenol A or bisphenol F | 5-40 |
| Cross-linking Agent | Tetrabromobisphenol A or tetra-DOPO-bisphenol A | 0.5-10 |
| | Flame retardant | 0-20 |
| Filler 1 | Fused silica | 2.5-25 |
| Filler 2 | Talc | 2.5-12.5 |
| UV Blocker | Tinopal OB (Optional) | 0.01-0.03 |

In one aspect, this invention includes resins having the following ingredients were the weight percent amounts are reporting on a total solids (solvent free) basis:
1. 10-40 wt % styrene maleic anhydride copolymer (SMA);
2. 5-40 wt % Epoxy (a combination of brominated or non-brominated bisphenol A or bisphenol F);
3. 0-20 wt % Tetrabromobisphenol A or tetra-DOPO-bisphenol A;
4. 5-20% halogen containing or halogen free flame retardants such as bromine or phosphorus based monomers or resins;
5. 5-40 wt % filler combination (two or more fillers combined) of the following possibilities: fused silica, crystalline silica, fumed silica, talc, clay, core shell rubber particles or particulate flame retardants.

In yet another aspect, this invention includes resins having the following ingredients were the weight percent amounts are reporting on a total weight basis including solvent(s):
1. 30%-40% solvent package of low and high boiling solvent: methyl ethyl ketone, cyclohexanone;
2. 15%-30% Styrene maleic anhydride co-polymer (SMA)
3. 10%-20% Epoxy—combination of brominated or non-brominated epoxy;
4. 0.5%-10% Tetrabromobisphenol A or tetra-DOPO-bisphenol A;
5. 5%-12.5% Talc
6. 5%-25% Fused silica
7. 0.01%-0.03% Tinopal OB (UV blocker) (optional)
8. 0.01-0.13% Tetrabutylphosphonium acid acetate (TBPAAc), 2-methylimidazole (2-MI), or 2-phenylimidiazole (2-PI).

Solvents

One or more solvents are typically incorporated into the resin compositions of this invention in order to solubilize the appropriate resin composition ingredients, and/or to control resin viscosity, and/or in order to maintain the ingredients in a suspended dispersion. Any solvent known by one of skill in the art to be useful in conjunction with thermosetting resin systems can be used. Particularly useful solvents include methyl ethyl ketone (MEK), toluene, dimethylformamide (DMF), acetone, propyl acetate, cyclohexanone and combinations thereof.

When used, solvents are present in the resin in an amount of from about 20 wt % to about 50 wt % as a weight percentage of the total weight of the solvent-containing resin composition. A useful solvent is a combination of a low and high boiling point solvent such as methyl ethyl ketone and cyclohexane.

Optional Ingredients (a) Tougheners

The thermosetting resin compositions of this invention may include one or more tougheners. The tougheners are added to the resin compositions to improve the drilling performance of the resulting composites and laminates. Useful tougheners include methyl methacrylate/butadiene/styrene copolymer, methacrylate butadiene styrene core shell particles, and mixtures thereof. A preferred toughener is methacrylate butadiene styrene core shell particles, which is available from Rohm & Haas (100 Independence Mall West, Philadelphia, Pa.) under the trade name Paraloid®. When used, tougheners are present in the thermosetting resin compositions of this invention in an amount from about 1% to about 5%, preferably from about 2 to about 4%, based on 100% by weight solids of the composition.

(b) Other Optional Ingredients

Optionally, the compounded resin may also contain other additives such as defoaming agents, leveling agents, dyes, and pigments. For example, a fluorescent dye can be added to the resin composition in a trace amount to cause a laminate prepared therefrom to fluoresce when exposed to light with optical inspection equipment. A useful fluorescent dye is a highly conjugated diene dye. One example of such a dye is UVITEX® OB (2,5-thiophenediylbis(5-tert-butyl-1,3-benzoxazole), available from Ciba Specialty Chemicals, Tarrytown, N.Y.

Other optional ingredients known by persons of skill in the art to be useful in resins that are used to manufacture printed circuit board laminates may also be included in the resin compositions of this invention.

The prepregs and laminates of this invention made with resin systems including a combination of fumed silica and talc synergistically exhibit lower expansion under thermal stress and reflow which is especially the case as the quantity of styrene increases in ratio to the anhydride in the SMA. This expansion improvement caused by the combination of fillers improves even more with increasing SMA steric to anhydride ratios with anhydride to styrene ratios of 1:1; 1:2; 1:3; 1:4; 1:5; 1:6, 1:7, 1:8, and 1:9 being especially useful.

In another aspect of this invention, the resins can include different ratios of SMA's and different combinations of SMA's. For instance, a combination that would include having two or more of the anhydride to styrene ratios, 1:3, 1:4, 1:5, 1:6, together with the talc and fumed silica combined filler may be used. Extensions of these filler combinations include any filler type similar to talc that is composed of platelets in combination with spherical or oblong or even porous shaped silica fillers. This would include a combination of any of these shaped filler such as a shell rubber core particle that is generally spherical. Resins including such a filler combination are more homogenous thereby improving thermal properties that are specific to laminates and prepreg materials used in the PCB industry. The industry has a long history of thermal requirements that help to prevent any delamination of the laminates inside a printed circuit boards. The resins including the combination of fillers disclosed above when incorporated into laminates that are used in PCB's prevent PCB delamination in addition to reducing laminate expansion under thermal stress.

The combination of resin ingredients—including the two different fillers—produces a product that exhibits increased expansion as the ratio of the steric bulk is greater in the SMA system. This greater ratio is desirable for low dielectric constant properties, but with this advantage there comes an increase of expansion and thermal instability that has been solved in most recent history by the use of silica filler alone.

The combination of two fillers in the resins described herein help decrease expansion and thermal stability especially under thermal stress and reflow and decrease the threat of delamination and/or white glass crazing and/or wicking.

Prepregs and Laminates

The resins described above are useful for preparing prepregs and/or laminates used in the manufacture of printed circuit boards. In order to be useful in manufacturing printed circuit boards the laminates can be partially cured or B-staged (in which instance they are referred to as prepregs) in which state they can be laid up with additional material sheets and fully cured ("C-staged") to form a layup or PCB. Alternatively, the resins can incorporated into C-staged laminate sheets, resin coated copper sheets or interlayer sheets.

In one useful method, the resin is used to manufacture prepregs in a batch or in a continuous process. Prepregs are generally manufactured using a reinforcing material such a woven glass web (fabric) which is unwound into a series of drive rolls. The web is then conveyed to a coating area where the web is immersed in a tank containing the thermosetting resin including solvent at which point the glass web becomes saturated with the resin. The resin saturated glass web is then passed through a pair of metering bars or rolls to remove excess resin from the saturated glass web and thereafter, the resin coated web travels the length of a drying tower for a selected period of time until the solvent is evaporated from the web. Optional second and subsequent coatings of resin can be applied to the web by repeating these steps until the preparation of the prepreg is complete whereupon the prepreg is wound. The woven glass web can be substituted with a woven fabric material, paper, plastic sheets, felt, and/or particulate materials such as glass fiber particles or particulate materials.

In another process for manufacturing prepreg or laminate materials, thermosetting resins of this invention are pre-mixed in a mixing vessel under ambient temperature and pressure. The viscosity of the pre-mix is ~600-1000 cps and can be adjusted by adding or removing solvent from the resin. Fabric substrate (typically but not limited to E glass) is pulled through a dip tank including the premixed resin, through an oven tower where excess solvent is driven off and the prepreg is rolled or sheeted to size, layed up between Cu foil in various constructions depending on glass weave style, resin content & thickness requirements.

The thermosetting resin (resin) mix can also be applied in a thin layer to a Cu foil substrate (RCC—resin coated Cu) using slot-die or other related coating techniques.

The prepregs, laminates, resin coated copper foils and like, all made using resins described herein are useful in manufacturing printed circuit boards (PCBs) using manufacturing techniques that are well known in the art.

EXAMPLES

Resins were prepared having a single talc filler (ISE-S4) and having a filler including silica and talc (ISE-S3) according to the formulation below. The resins were used to prepare prepregs and laminates including resin impregnated glass fabrics of the same type. The prepregs and laminates were then used to prepare a 24 layer multi-layer printed circuit test boards having the specifications set forth in Table 3 below and subsequently tested for many properties including their ability to withstand delamination, their ability to withstand wicking and their ability to withstand white glass crazing.

TABLE 3

| | ISE-S3 - 24L stack-up | | ISE-S4 - 24L Stack-up |
|---|---|---|---|
| | 1 oZ Cu | | 1 oZ Cu |
| L1 | 1 × 2116 RC58.1% | L1 | 1 × 2116 RC57.8% |
| L2 | 4 mil [2 × 106] H/H | L2 | 4 mil [2 × 106] H/H |
| L3 | 1 × 2116 RC58.1% | L3 | 1 × 2116 RC57.8% |
| L4 | 4 mil [2 × 106] H/H | L4 | 4 mil [2 × 106] H/H |
| L5 | 1 × 2116 RC58.1% | L5 | 1 × 2116 RC57.8% |
| L6 | 4 mil [2 × 106] H/H | L6 | 4 mil [2 × 106] H/H |
| L7 | 1 × 2116 RC58.1% | L7 | 1 × 2116 RC57.8% |
| L8 | 5 mil [1 × 2116] 1/1 | L8 | 5 mil [1 × 2116] 1/1 |
| L9 | 2 × 1080 RC69% | L9 | 2 × 1080 RC68.7% |
| L10 | 4 mil [2 × 106] 2/2 | L10 | 4 mil [2 × 106] 2/2 |
| L11 | 2 × 1080 RC69% | L11 | 2 × 1080 RC68.7% |
| L12 | 5 mil [1 × 2116] 1/1 | L12 | 5 mil [1 × 2116] 1/1 |
| L13 | 2 × 1080 RC69% | L13 | 2 × 1080 RC68.7% |
| L14 | 4 mil [2 × 106] 2/2 | L14 | 4 mil [2 × 106] 2/2 |
| L15 | 2 × 1080 RC69% | L15 | 2 × 1080 RC68.7% |
| L16 | 5 mil [1 × 2116] 1/1 | L16 | 5 mil [1 × 2116] 1/1 |
| L17 | 1 × 2116 RC58.1% | L17 | 1 × 2116 RC57.8% |
| L18 | 4 mil [2 × 106] H/H | L18 | 4 mil [2 × 106] H/H |
| L19 | 1 × 2116 RC58.1% | L19 | 1 × 2116 RC57.8% |
| L20 | 4 mil [2 × 106] H/H | L20 | 4 mil [2 × 106] H/H |
| L21 | 1 × 2116 RC58.1% | L21 | 1 × 2116 RC57.8% |
| L22 | 4 mil [2 × 106] H/H | L22 | 4 mil [2 × 106] H/H |
| L23 | 1 × 2116 RC58.1% | L23 | 1 × 2116 RC57.8% |
| L24 | 1 oZ Cu | L24 | 1 oZ Cu |

In Table 3, 1×2116RC57.8% refers for example to a prepreg having 1-ply layer of 2116 woven glass having a resin content (RC) of 57.8%. 4 mil[2×106]H/H refers to a fully cured 4 mm laminate made from two resin coated layers of 106 glass cloth. In addition to the two resins listed above, IS415, a commercially available SMA/epoxy resin prepreg (without any fillers) was also used in preparing a test boards as described in Table 3 above.

The ISE-S3 resin had the formula set forth in Table 4 below.

TABLE 4

| Component | Chemical Name | Resin Formula - (parts by weight) |
|---|---|---|
| Styrene maleic anhydride co-polymer | SMA | 17.6 |
| Epo y resin | Bisphenol A | 10.3 |
| Epoxy resin | Brominated Bisphenol A | 11.1 |
| Cross-Linking Agent | Tetrabromobisphenol A | 5.6 |
| Filler | Silated Talc | 5.8 |
| Filler | Amorphous fused silica (silated) | 5.8 |
| Solvent | MEK | 26.8 |
| Solvent | Cyclohexanone | 15.2 |
| Catalyst | Tetrabuylphosphonium acid acetate | 0.1 |

Includes optional Paraloid—1.7 wt %
UV Blocker—0.02 wt %

The printed circuit board tested was a test vehicle including:
Multiple pitch dimensions and BGA designs;
24 L and approximately 3 mm thick with 4 layers of 2 ounce copper;
Resin contents adjusted based on density of the two variants and targeted to maintain same volume of resin;
The ISE-S4 resin had a similar formula but used all talc (11.6 wt %).
The IS415 resin had a similar formula but omitted fillers altogether.
The testing results of on the test vehicle indicated that:
Both ISE-S3 and ISE-S4 performed well in terms of thermal performance after 6×260° C. IR reflow.
However, ISE-S3 performed better than ISE-S4 in several important areas. ISE-S3 had:
Greater resistance to delamination
Less white glass/crazing
Higher Tg at T288
ISE-S4 exhibited Interconnect Defects ICD's while ISE-S3 did not.
The results of the mechanical, thermal and electrical test performed on each of the three test boards are set forth in the Tables 5-7 below.

TABLE 5

| RESULTS SUMMARY | | | | | IS415 | ISE-S3 | ISE-S4 |
|---|---|---|---|---|---|---|---|
| Test | Test Method | Description | | Units | 24L board | 24L board | 24L board |
| | | | THERMAL | | | | |
| DSC Tg | IPC-TM-650 2.4.25 | Scan 1 | | ° C. | 180.7 | 175.4 | 153.7 |
| | | Scan 2 | | ° C. | 183.4 | 177.4 | 162.8 |
| | | Delta Tg | | ° C. | 2.7 | 2.0 | 9.1 |
| TMA (Tg and z-CTE) | IPC-TM-650 2.4.24 | Tg | | ° C. | 176.0 | 169.7 | 155.1 |
| | | Initial Thickness | | mm | 3.2320 | 2.8850 | 3.2074 |
| | | z-CTE Pre-Tg | | ppm/° C. | 78.6 | 71.0 | 68.1 |
| | | z-CTE Post-Tg | | ppm/° C. | 374.4 | 323.5 | 320.6 |
| | | Expansion (50-260° C.) | | % | 4.2 | 3.8 | 4.0 |
| | | Expansion (50-288° C.) | | % | 5.3 | 4.6 | 4.9 |
| | | Td | | ° C. | — | — | — |
| T-260 | IPC-TM-650 2.4.24.1 | Clad | | min | 6.8 | >60 | >60 |
| | | Unclad | | min | — | — | — |
| T-288 | IPC-TM-650 2.4.24.1 | Clad | | min | 0.7 | 7.5 | 2.0 |
| | | Unclad | | min | — | — | — |
| TGA Td | IPC-TM-650 2.4.24.6 | 0.5% wt loss | | ° C. | 323.4 | 331.6 | 336.5 |
| | | 1.0% wt loss | | ° C. | 334.7 | 342.0 | 343.8 |
| | | 1.5% wt loss | | ° C. | 339.7 | 345.8 | 346.5 |
| | | 2.0% wt loss | | ° C. | 342.6 | 348.1 | 348.2 |
| | | 2.5% wt loss | | ° C. | 344.6 | 349.9 | 349.5 |
| | | 3.0% wt loss | | ° C. | 346.0 | 351.3 | 350.5 |
| | | 3.5% wt loss | | ° C. | 347.0 | 352.5 | 351.5 |
| | | 4.0% wt loss | | ° C. | 347.9 | 353.6 | 352.4 |
| | | 4.5% wt loss | | ° C. | 348.7 | 354.5 | 353.2 |
| | | 5.0% wt loss | | ° C. | 349.4 | 355.4 | 354.0 |

TABLE 5-continued

| RESULTS SUMMARY | | | | IS415 | ISE-S3 | ISE-S4 |
|---|---|---|---|---|---|---|
| Test | Test Method | Description | Units | 24L board | 24L board | 24L board |
| | | THERMAL | | | | |
| DMA Tg | IPC-TM-650 | 1st Scan (Tan Delta) | ° C. | 199.3 | 200.7 | 190.6 |
| | 2.4.24.4 | 2nd Scan (Tan Delta) | ° C. | 197.5 | 207.5 | 193.4 |
| | | Delta Tg (Tan Delta) | ° C. | −1.8 | 6.8 | 2.8 |
| DMA Modulus | IPC-TM-650 | Storage Modulus @ 50° C. (1st scan Tan Delta) | MPa | 10,453 | 13,070 | 12,256 |
| (internal | 2.4.24.4 | Storage Modulus @ 100° C. (1st scan Tan Delta) | MPa | 10,316 | 12,870 | 12,018 |
| reference only) | | Storage Modulus @ 150° C. (1st scan Tan Delta) | MPa | 9,858 | 12,160 | 10,448 |
| | | Storage Modulus @ 200° C. (1 st scan Tan Delta) | MPa | 2,176 | 4,025 | 1,529 |
| | | Storage Modulus @ 250° C. (1 st scan Tan Delta) | MPa | 915 | 2,018 | 1,103 |

TABLE 6

| RESULTS SUMMARY | | | | IS415 | ISE-S3 | ISE-S4 |
|---|---|---|---|---|---|---|
| Test | Test Method | Description | Units | 24L PCB | 24L PCB | 24L PCB |
| | | DIMENSIONAL/MICRO | | | | |
| X-section | IPC-TM-650 | White Glass | um | 137 | 116 | 264 |
| IR reflow 6 × 260° C. - | 2.1.1 | Wicking | um | 33 | 36 | 44 |
| 1.0 mm BGA back-drill | | ICD (of interconnects inspected) | No./No. | No Interconnect | No Interconnect | No Interconnect |
| X-section | IPC-TM-650 | White Glass | um | 186 | 100 | 240 |
| IR reflow 6 × 260° C. - | 2.1.1 | Wicking | um | 47 | 32 | 47 |
| 1.0 mm BGA | | ICD (of interconnects inspected) | No./No. | No Interconnect | No Interconnect | No Interconnect |
| X-section | IPC-TM-650 | White Glass | um | 193 | 104 | 201 |
| IR reflow 6 × 260° C. - | 2.1.1 | Wicking | um | 43 | 36 | 41 |
| 0.8 mm BGA | | ICD (of interconnects inspected) | No./No. | No Interconnect | No Interconnect | No Interconnect |
| X-section | IPC-TM-650 | White Glass | um | 160 | 97 | 223 |
| IR reflow 6 × 260° C. - | 2.1.1 | Wicking | um | 51 | 40 | 46 |
| 1.0 mm BGA (reference) | | ICD (of interconnects inspected) | No./No. | 0/280 | 0/280 | 0/280 |
| X-section | IPC-TM-650 | White Glass | um | 214 | 99 | 262 |
| IR reflow 6 × 260° C. - | 2.1.1 | Wicking | um | 39 | 40 | 47 |
| 0.8 mm BGA (reference) | | ICD (of interconnects inspected) | No./No. | 0/200 | 0/200 | 0/200 |

TABLE 7

| RESULTS SUMMARY | | | | IS415 | ISE-S3 | ISE-S4 |
|---|---|---|---|---|---|---|
| Test | Test Method | Description | Units | 24L PCB | 24L PCB | 24L PCB |
| | | DIMENSIONAL/MICRO | | | | |
| X-section | IPC-TM-650 | White Glass | um | 151 | 70 | 154 |
| IR reflow 6 × 260° C. - | 2.1.1 | Wicking | um | 51 | 31 | 43 |
| thermal via 1.0 mm (with soldermask) | | ICD (of interconnects inspected) | No./No. | 0/360 | 0/360 | 0/360 |
| X-section | IPC-TM-650 | White Glass | um | 170 | 109 | 135 |
| IR reflow 6 × 260° C. - | 2.1.1 | Wicking | um | 41 | 36 | 42 |
| thermal via 0.8 mm (with soldermask) | | ICD (of interconnects inspected) | No./No. | 0/360 | 0/360 | 1/360 |
| X-section | IPC-TM-650 | White Glass | um | 132 | 92 | 136 |
| IR reflow 6 × 260° C. - | 2.1.1 | Wicking | um | 40 | 30 | 40 |
| thermal via 0.65 mm (with soldermask) | | ICD (of interconnects inspected) | No./No. | 0/396 | 0/396 | 4/396 |
| X-section | IPC-TM-650 | White Glass | um | 153 | 57 | 167 |
| IR reflow 6 × 260° C. - | 2.1.1 | Wicking | um | 35 | 25 | 37 |
| thermal via 0.5 mm (with soldermask) | | ICD (of interconnects inspected) | No./No. | 0/660 | 0/660 | 18/660 |
| X-section | IPC-TM-650 | White Glass | um | 163 | 91 | 139 |
| IR reflow 6 × 260° C. - | 2.1.1 | Wicking | um | 28 | 30 | 39 |
| thermal via 1.0 mm | | ICD (of interconnects inspected) | No./No. | 0/360 | 0/360 | 5/360 |
| X-section | IPC-TM-650 | White Glass | um | 125 | 90 | 153 |
| IR reflow 6 × 260° C. - | 2.1.1 | Wicking | um | 30 | 31 | 44 |
| thermal via 0.8 mm | | ICD (of interconnects inspected) | No./No. | 0/360 | 0/360 | 2/360 |
| X-section | IPC-TM-650 | White Glass | um | 139 | 105 | 148 |
| IR reflow 6 × 260° C. - | 2.1.1 | Wicking | um | 37 | 36 | 38 |
| thermal via 0.65 mm | | ICD (of interconnects inspected) | No./No. | 0/396 | 0/396 | 2/396 |
| X-section | IPC-TM-650 | White Glass | um | 121 | 124 | 178 |
| IR reflow 6 × 260° C. - | 2.1.1 | Wicking | um | 30 | 25 | 41 |
| thermal via 0.5 mm | | ICD (of interconnects inspected) | No./No. | 0/660 | 0/660 | 10/660 |

Tables 6-7 detail the results of IR reflow tests at 260 degrees centigrade. The IR reflow tests (infrared reflow soldering) of vias and ball grid arrays. The reflow tests indicate that the boards made with the ISE-S3 prepregs and laminates exhibited wicking and white glass crazing results that were consistently better than the boards made with IS415 and ISE-S4 prepregs and laminates.

It should be noted that wicking is a measure of the distance copper migrates into glass bundles adjacent to plated through holes. Further, "crazing" or "white glass" as it is referred to in the tables above refers to the amount (distance) of separation between the epoxy system and individual glass fibers. When viewed with a microscope in a cross-section, crazing produces a silver or white sheen running down individual glass fibers. The silver sheen is created by the air gap around the individual glass fibers reflecting light In addition, the boards were cut open and viewed in cross-section after the 6× IR reflow 260° C. testing and visually examined for delamination, i.e. areas where adjacent prepreg or laminate layers have separated. The visual results are reported in Table 8 below.

TABLE 8

Delamination Examination Results

| Board Type | IS415 | ISE-S3 | ISE-S4 |
|---|---|---|---|
| 1.0 mm BGA (Backdrill cupon) | Yes delamination | None | None |
| 1.0 mm BGA | Yes delamination | None | None |
| 0.8 mm BGA | Yes delamination | None | Yes delamination |
| 0.8 mm BGA (reference) | Yes delamination | None | Yes delamination |
| 1.0 mm Thermal Via (with soldermask) | Yes delamination | None | None |
| 0.8 mm Thermal Via (with soldermask) | Yes delamination | None | None |
| 1.0 mm Thermal Via | Yes delamination | None | None |
| 0.8 mm Thermal Via | Yes delamination | None | None |
| 0.6 mm Thermal Via | Yes delamination | None | Yes delamination |

BGA = Ball Grid Array

The results from Table 8 above demonstrate that the boards made with laminates including the silica/talc filler combination exhibited no delamination after reflow tests in BGA and thermal via applications.

Having described resins and articles containing resins in detail above and by reference to specific examples thereof above, it will be apparent that modifications and variations are possible without departing from the scope of the disclosure defined in the appended claims. More specifically, although some aspects of the present disclosure are identified herein as particularly advantageous, it is contemplated that the present invention is not necessarily limited to these particular aspects of the disclosure.

What is claimed is:

1. A resin composition comprising:
   styrene maleic anhydride co-polymer;
   at least one epoxy resin selected from a brominated bisphenol A epoxy resin, a brominated bisphenol F epoxy resin, a non-brominated bisphenol A epoxy resin, a non-brominated bisphenol F epoxy resin, and combinations thereof;
   at least one cross-linking agent selected from tetrabromobisphenol A, tetra-DOPO-bisphenol A, and mixtures thereof;
   talc; and
   silica.

2. The resin of claim 1 wherein the talc is present in the resin in an amount ranging from about 2.5 to about 15 wt % on a dry basis.

3. The resin of claim 1 wherein the silica is present in the resin in an amount ranging from about 2.5 to about 25 wt % on a dry basis.

4. The resin of claim 1 wherein the silica is fused silica.

5. The resin of claim 1 wherein the silica is a silated silica.

6. The resin of claim 1 wherein the talc is a silated talc.

7. The resin of claim 1 including from about 5 to about 12.5 wt % talc and from about 5 to about 25 wt % of silated fused silica each on a dry basis.

8. The resin of claim 1 wherein the styrene maleic anhydride co-polymer is present in the resin in an amount ranging from about 5 to about 40 wt % on a dry basis.

9. The resin of claim 1 wherein the at least one epoxy resin is present in the resin in an amount ranging from about 10 to about 50 wt % on a dry basis.

10. The resin of claim 1 wherein the at least one epoxy resin is a combination of a brominated bisphenol A and a non-brominated bisphenol A.

11. The resin of claim 1 wherein the at least one cross-linking agent is present in the resin in an amount ranging from greater than 0 to about 20 wt % on a dry basis.

12. The resin of claim 1 wherein the at least one cross-linking agent is a mixture of tetrabromobisphenol A and tetra-DOPO-bisphenol A.

13. The resin of claim 1 including from about 0.01 to about 3.0 wt % on a dry basis of at least one azo-type catalyst.

14. The resin of claim 1 including a catalyst selected from azobisisobutyronitrile, 2-propyl imidiazole, tetrabutylphophonium acid acetate, 2-methylimidazole and combinations thereof.

15. A resin composition comprising:
   from about 5 to about 40 wt % on a dry solvent free resin basis of a styrene maleic anhydride co-polymer;
   from about 10 to about 50 wt % on a dry solvent free resin basis of at least one epoxy resin selected from a brominated bisphenol A epoxy resin, a brominated bisphenol F epoxy resin, a non-brominated bisphenol A epoxy resin, a non-brominated bisphenol F epoxy resin, and combinations thereof;
   from about greater than 0 to about 20 wt % on a dry solvent free resin basis of at least one cross-linking agent selected from tetrabromobisphenol A, tetra-DOPO-bisphenol A, and mixtures thereof;
   from about 2.5 to about 15 wt % talc; and
   from about 2.5 to about 15 wt % fumed silica.

16. The resin composition of claim 15 wherein the weight ratio of fumed silica to talc ranges from 1:2.5 to 5:1.

17. The resin composition of claim 15 wherein the weight ratio of fumed silica to talc ranges from 1:1 to 2.5:1.

18. The resin composition of claim 15 wherein the fumed silica is an amorphous silated fumed silica.

19. The resin composition of claim 15 wherein the talc is silated talc.

20. The resin composition of claim 15 wherein the at least one cross-linking agent is a mixture of tetrabromobisphenol A and tetra-DOPO-bisphenol A.

21. The resin composition of claim 15 further including a catalyst that is tetrabutylphosphonium acid acetate.

22. A prepreg including a reinforcing material impregnated with the resin of claim 1.

23. A laminate including a reinforcing material and the resin of claim 1 wherein the resin is C-staged.

24. A resin coated copper foil comprising a copper foil sheet having a first planar surface and a second planar surface wherein a layer of resin of claim 1 is applied to at least one of the planar surfaces and wherein the resin is B-staged or C-staged.

25. The prepreg of claim 22 wherein the prepreg is incorporated into a printed circuit board and wherein the printed circuit board does not undergo delamination in the area of the prepreg.

26. The printed circuit board of claim 25 wherein the IR 260° C. reflow wicking is 40 microns or less.

* * * * *